(12) United States Patent
Cho et al.

(10) Patent No.: US 6,912,639 B2
(45) Date of Patent: Jun. 28, 2005

(54) MEMORY MANAGEMENT METHOD AND APPARATUS FOR USE IN AN OPEN GEOGRAPHIC INFORMATION SYSTEM

(75) Inventors: Dae-Soo Cho, Busan (KR); Kwang Soo Kim, Daejeon (KR); Hae Ock Choi, Daejeon (KR); Jong-Hun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 589 days.

(21) Appl. No.: 10/142,055

(22) Filed: May 10, 2002

(65) Prior Publication Data

US 2003/0120857 A1 Jun. 26, 2003

(30) Foreign Application Priority Data

Dec. 24, 2001 (KR) ........................................ 2001-84435

(51) Int. Cl.[7] .............................................. G06F 12/00
(52) U.S. Cl. ............................. 711/170; 354/543; 707/1
(58) Field of Search ................................ 711/113, 118, 711/154, 170; 345/543; 709/203; 707/1–3, 10

(56) References Cited

U.S. PATENT DOCUMENTS 5,864,837 A    1/1999  Maimone
5,987,476 A   11/1999  Imai et al.
6,353,820 B1 * 3/2002  Edwards et al. ................ 707/2

OTHER PUBLICATIONS

Michael J. Franklin, et al.; Local Disk Caching for Client-Server Database Systems; Proceedings of the 19th VLDB Conference; Dublin, Ireland, 1993; pp. 641–654.

* cited by examiner

Primary Examiner—Nasser Moazzami
(74) Attorney, Agent, or Firm—Mayer, Brown, Rowe & Maw LLP

(57) ABSTRACT

A memory management apparatus for use in an open geographic information system includes a plurality of layers, each layer requiring a layer component, a disk buffer management component, a memory buffer management component and a spatial index management component; a layer collection component having a plurality of layer components, each layer component containing responsibility of managing all of the spatial data included in one layer accessed thereto through a data provider component; and a total memory management component. In the system the total memory management component manages totally a memory buffer to spatial data included in one or more layers, allocates a corresponding memory if each of memory buffer management components requests a memory buffer and frees a memory of a predetermined memory buffer management component when an available memory lacks.

9 Claims, 5 Drawing Sheets

MEMORY MANAGEMENT METHOD AND APPARATUS FOR USE IN AN OPEN GEOGRAPHIC INFORMATION SYSTEM

FIELD OF THE INVENTION

The present invention relates to a memory management method and apparatus for use in an open geographic information system; and, more particularly, to a method and apparatus for managing a memory of a client in a client/server structure of an open geographic information system.

DESCRIPTION OF THE PRIOR ART

In a conventional geographic information system, data request and data transmission between a client and a server are performed through a proprietary interface for each software vendor. Accordingly, the client can utilize data or information sufficient to manage a memory, e.g., a size of data page, structure and contents of a spatial index and an object identifier and so on.

In a recent geographic information system, the geographic information system is an open-type, a standard interface is defined and used between the client and the server. Accordingly, while the client can obtain interoperability with respect to different kinds of servers, since the client cannot use additional meta information of the servers, the memory management thereof is difficult.

SUMMARY OF THE INVENTION

It is, therefore, an object of the present invention to provide a memory management method and apparatus for use in processing multiple layer spatial data.

It is another object of the present invention to provide a spatial index creation and management method and apparatus for improving a speed of an access to spatial data.

In accordance with one aspect of the present invention, there is provided a memory management apparatus for use in an open geographic information system including:

a plurality of layers, each layer requiring a layer component, a disk buffer management component, a memory buffer management component and a spatial index management component;

a layer collection component having a plurality of layer components, each layer component containing responsibility of managing all of the spatial data included in one layer accessed thereto through a data provider component; and a total memory management component, wherein the total memory management component manages totally a memory buffer to a spatial data included in one or more layers, allocates a corresponding memory if each of memory buffer management components requests a memory buffer and frees a memory of a predetermined memory buffer management component when an available memory is not sufficient.

In accordance with another aspect of the present invention, there is provided a memory management method for use in a memory management apparatus in an open geographic information system, the apparatus including a display component, a query processing component, a data provider component, a layer collection component, a layer component, a disk buffer management component, a memory buffer management component, a spatial index management component and a total memory management component, the method comprising the steps of:

(a) requesting data access to a layer to be displayed next through the query processing component;

(b) inspecting whether a layer component for a corresponding layer exists or not;

(c) requesting spatial data to the layer component when the corresponding layer exists;

(d) creating a layer component and initializing a memory buffer for the memory management thereof when the corresponding layer does not exist;

(e) requesting spatial data to the data provider component and demanding memory management of spatial data through the generated layer component; and (f) displaying the requested spatial data on a screen.

BRIEF DESCRIPTION OF THE DRAWINGS

The above and other objects and features of the present invention will become apparent from the following description given in conjunction with the accompanying drawings, in which.

DETAILED DESCRIPTION OF THE PREFERRED EMBODIMENTS

Figure 1:
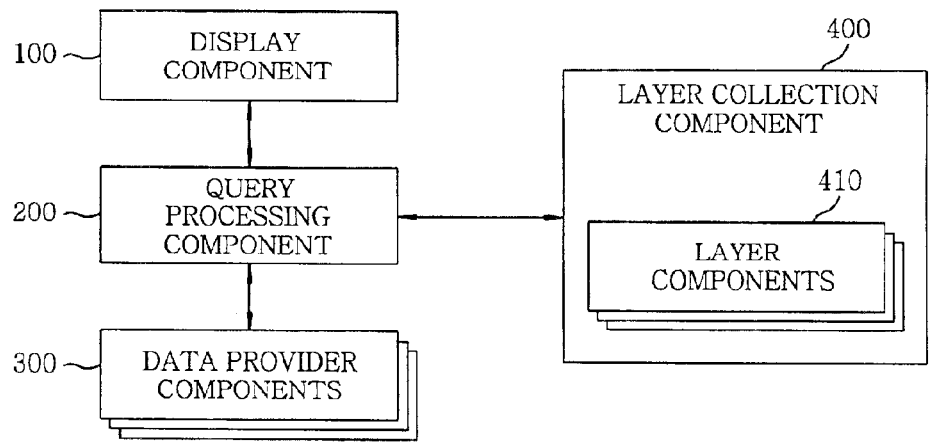
FIG. 1 illustrates a block diagram of an open geographic information system being capable of connecting with data providers to obtain access to different kinds of data servers in accordance with a preferred embodiment of the present invention.

FIG. 1 illustrates a block diagram of an open geographic information system 10 being capable of connecting with data providers to obtain access to different kinds of data servers in accordance with a preferred embodiment of the present invention. The open geographic information system 10 includes a display component 100, a query processing component 200, data provider components 300 and a layer collection component 400.

The query processing component 200 can access spatial data through the data provider components 300 capable of accessing a data server having corresponding spatial data when a query for the spatial data that a user concerns is requested to the query processing component 200.

The data provider components 300 can access different spatial data servers in a same manner since the data provider components 300 have complied with standard interfaces. The query processing component 200 is connected to the layer collection component 400. The layer collection component 400 can manage one or more layer components 410. The query processing component 200 can create layer components on a layer by layer basis based on spatial data received from the data provider components 300. Accordingly, when same spatial data is requested again, the query processing component 200 can request a corresponding data to a corresponding layer component 410 instead of requesting the corresponding data to the data provider components 300.

Figure 2:
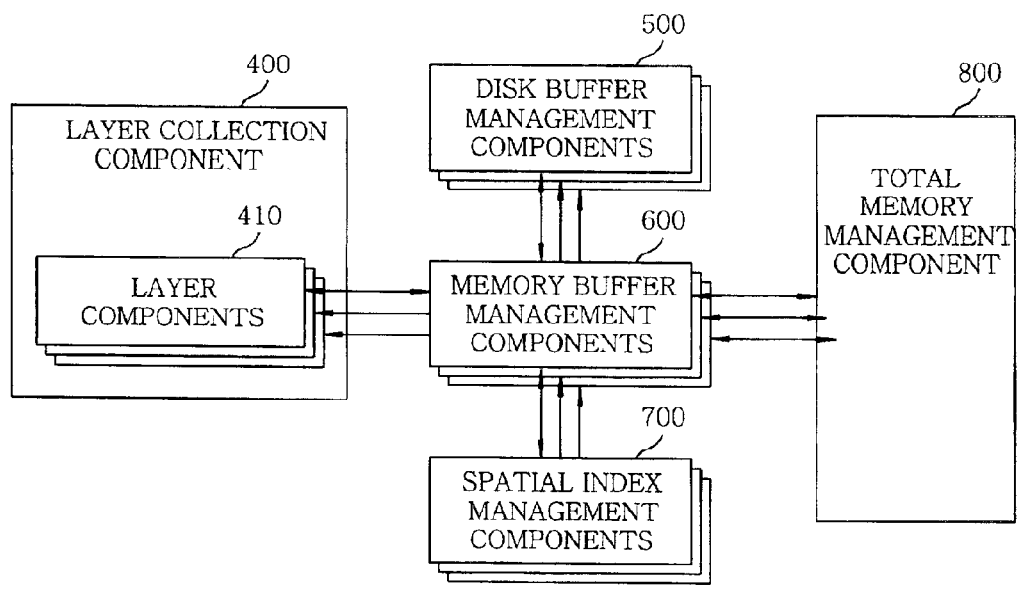
FIG. 2 depicts a memory management apparatus for use in an open geographic information system in accordance with a preferred embodiment of the present invention.

FIG. 2 depicts a memory management apparatus 40 for use in an open geographic information system in accordance with a preferred embodiment of the present invention. The apparatus 40 includes a layer collection component 400 having a plurality of layer components 410, disk buffer management components 500, memory buffer management components 600, spatial index management components 700 and a total memory management component 800, wherein the number of the total memory management component 800 is one regardless of the number of the layers.

In FIG. 2, each of the layer components 410 in the layer collection component 400 represents one corresponding layer accessed through a corresponding data provider component 300. To manage each layer, there is not only one layer component, but also one disk buffer management component 500, one memory buffer management component 600 and one spatial index management component 700. The total memory management component 800 functions to manage total memory buffers and is used to totally manage memory for the spatial data included in one or more layers. The total memory management component 800 allocates a corresponding memory if each of the memory buffer management components 600 requests a memory buffer and frees a memory of a predetermined memory buffer management component 600 when an available memory is not sufficient, e.g., when an available memory is not sufficient in comparison with a predetermined memory threshold.

When total memory management is not performed by using the total memory management component 800, i.e., when each of the memory buffer management components 600 executes a memory management in a separate way for spatial data of a corresponding layer, it becomes very difficult to determine the total size of the memory buffer. For example, when a variable length memory buffer is used, the total size of the memory buffer is not managed; accordingly, a memory buffer management component 600 that does not receive an allocated memory buffer should store all spatial data in a disk buffer managed by a corresponding disk buffer management component 500. In this case, spatial data should be read one by one from the disk, resulting in deterioration of the performance thereof.

Meanwhile, when a fixed length memory buffer is used, the number of memory buffer management components 600 is fixed; and there entails a waste of memories until the number of layer components 410 created by query processing component 200 reaches the maximum. As a result, the total memory management component 800 is necessary to totally manage memory buffers allocated to the memory buffer management components 600 performing memory management for all of the layer component 410. A display procedure of spatial data in a software component of the open geographic information system can be described in the following processes.

First, there entails a change in a screen in response to a request by a user. Second, the display component 100 of the open geographic information system 10 selects a layer to be displayed in accordance with a display priority. Third, if there is a layer component 410 for the selected layer, i.e., if a corresponding layer is stored in a memory buffer, spatial data is requested to the layer component 410. If otherwise, spatial data is requested to a corresponding data provider component 300. For the spatial data requested to the data provider component 300, a layer component 410 is created and spatial data is stored in a memory buffer thereof. Fourth, the accessed spatial data is displayed on a screen through a corresponding layer component or a corresponding data provider. Fifth, if there remains a layer to be displayed, the above-mentioned second to fourth processes are repeated in sequence.

Figure 3:
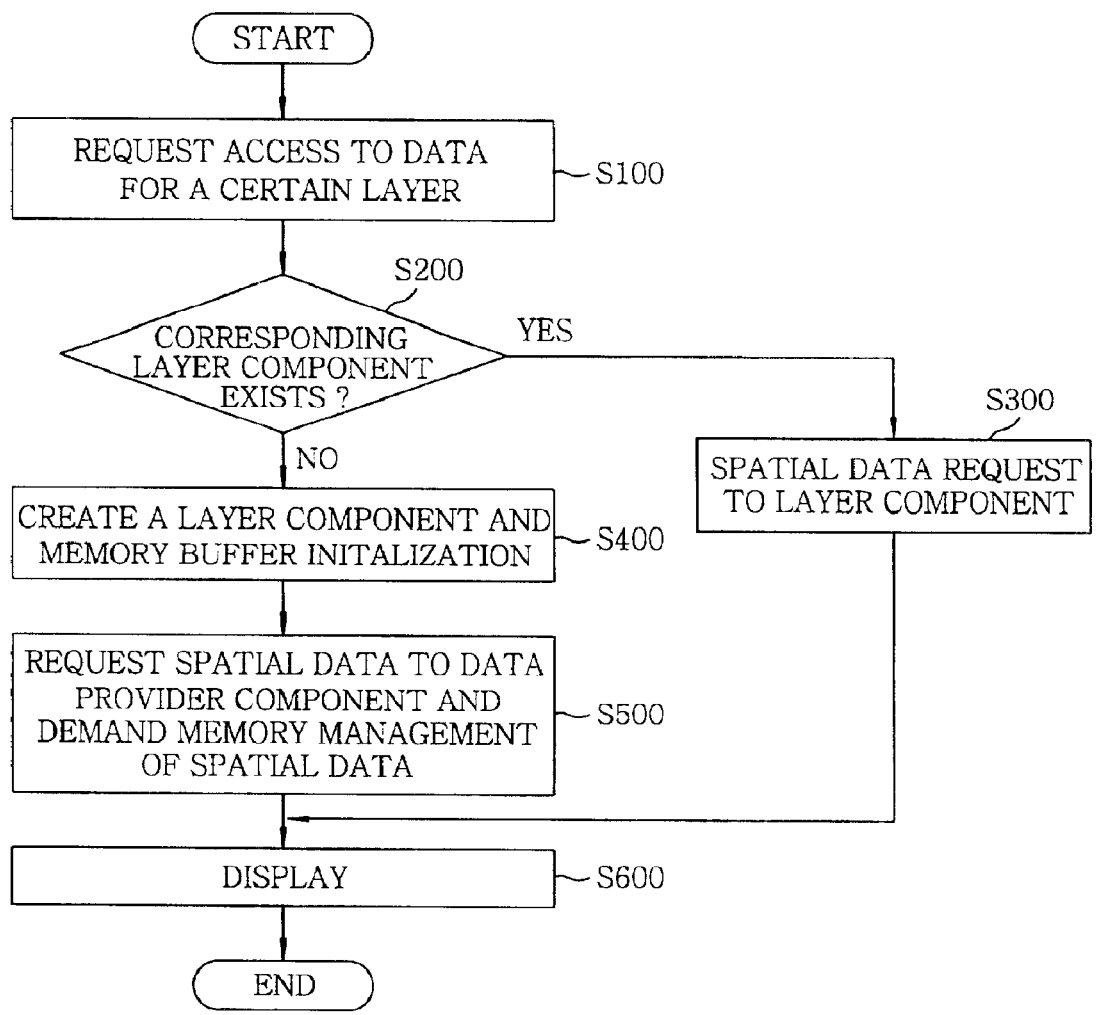
FIG. 3 shows a flow diagram of a method for displaying spatial data of a certain layer in a geographic information system in accordance with a preferred embodiment of the present invention.

FIG. 3 shows a flow diagram of a method for displaying spatial data of a certain layer in an open geographic information system in accordance with a preferred embodiment of the present invention. FIG. 3 represents the above-mentioned second to fourth processes.

In detail, at step S100, request of data access for a certain layer to be displayed next is executed through the query processing component 200. At step 200, there is carried out an inspection whether a layer component 410 for a corresponding layer exists or not. If the corresponding layer 410 exists, this represents that spatial data of the corresponding layer is managed in a memory. Accordingly, at step S300, spatial data is requested to the layer component 410. If the corresponding layer 410 does not exist, at step S400, a layer component 410 is created and a memory buffer is initialized for the memory management thereof.

Thereafter, at step S500, spatial data is requested to the data provider component 300 and memory management of spatial data through the generated layer component 410 is demanded. At step S600, the requested spatial data is displayed on a screen.

Figure 4:
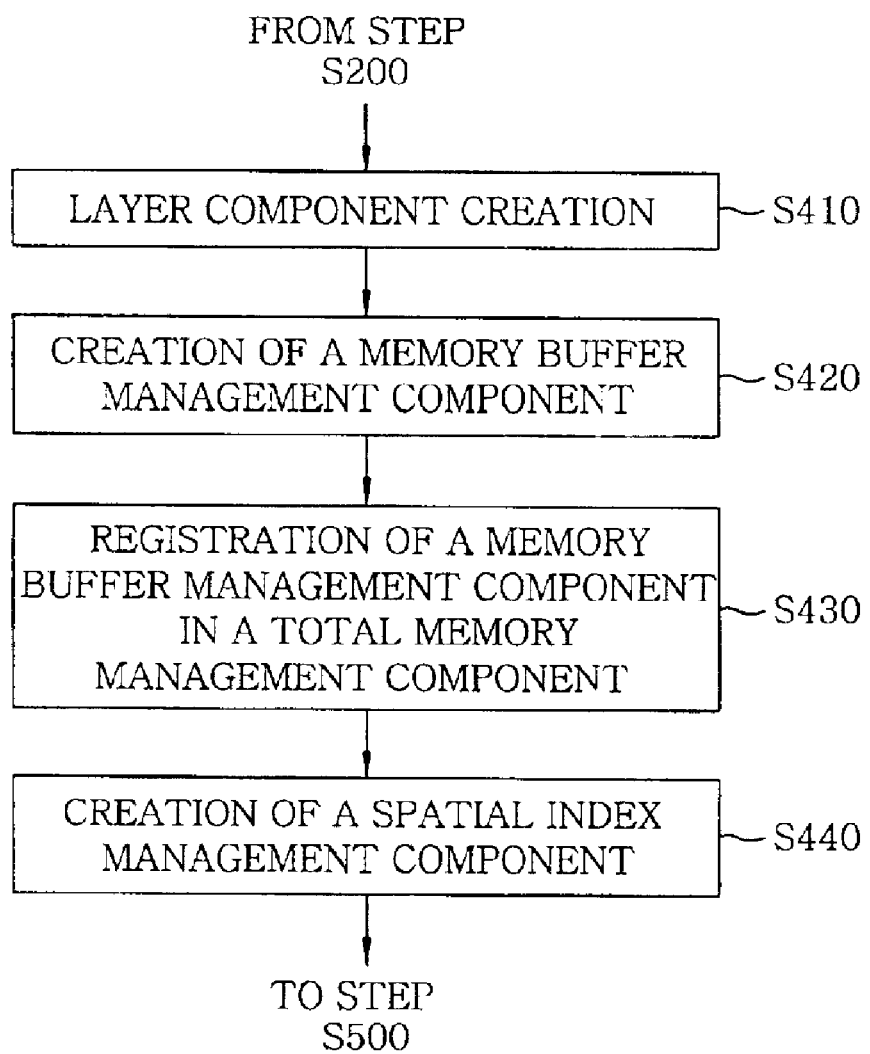
FIG. 4 presents a flow chart of generation of a layer component and initialization of a memory buffer shown in FIG. 3.

FIG. 4 presents a flow chart of creation of a layer component and initialization (S400) of a memory buffer shown in FIG. 3. Referring to FIG. 4, first, at step S410, a layer component 410 is created for the memory management thereof. Then, at step S420, a memory buffer management component 600 is created. At step S430, the created layer component 410 and the created memory buffer management component 600 are connected to each other and the created memory buffer management component 600 are registered in the total memory management component 800, thereby preparing allocation of a memory buffer; and At step S440, a spatial index management component 700 is created. Then the process goes to step S500. This spatial index uses a fixed grid file and is initialized as an index having one grid cell. Since in the present invention, the spatial index should be generated dynamically, an inexpensive fixed grid file can be used.

Figure 5:
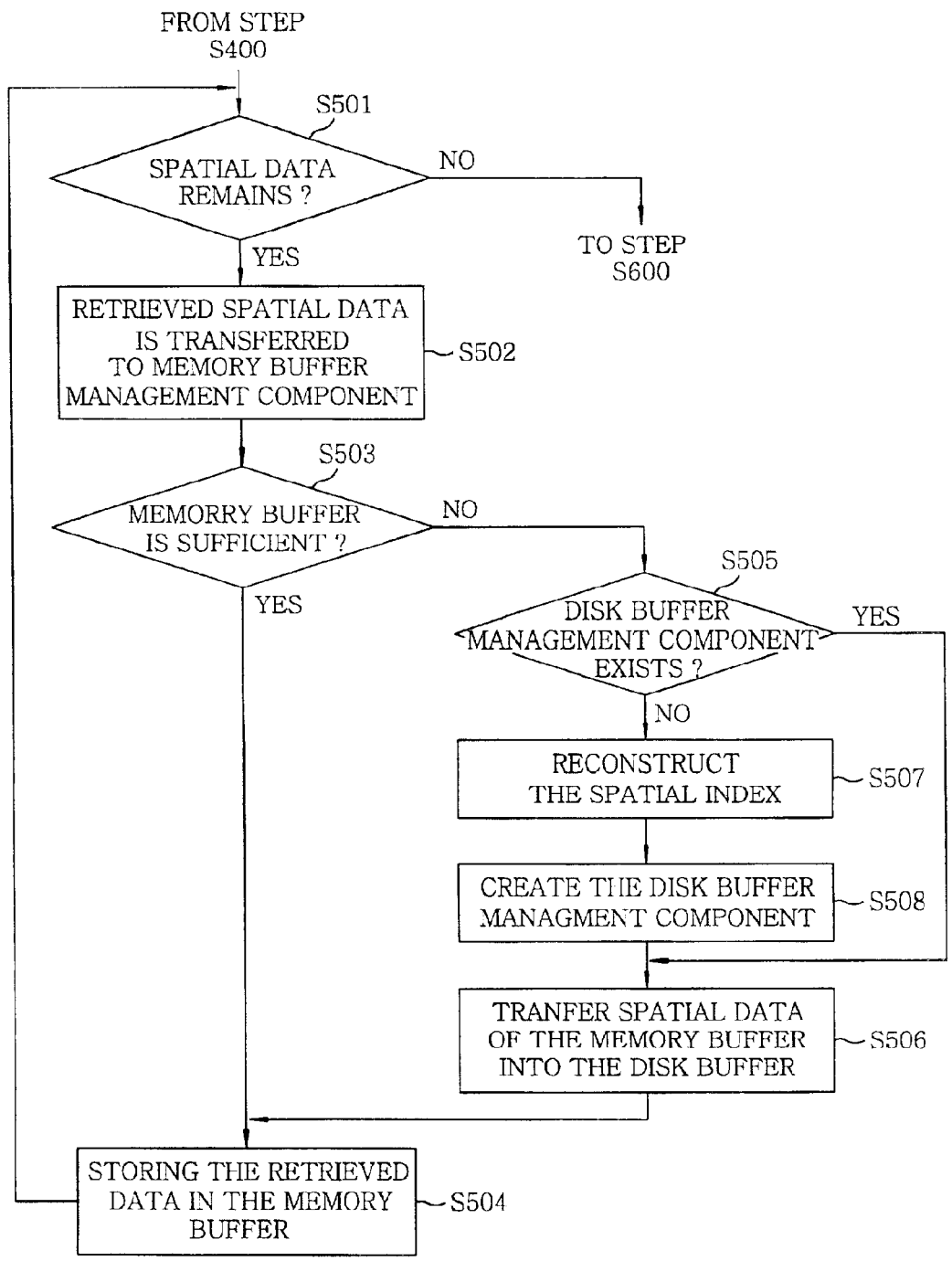
FIG. 5 sets forth a flow diagram of a process of data request to a data provider component and a process of storing data requested through a layer component shown in FIG. 3.

FIG. 5 sets forth a flow diagram of a process of data request (step S500) to a data provider component and a process of storing data requested through a layer component shown in FIG. 3. First, spatial data requested to the data provider component 300 feeds a spatial object one by one to the query processing component 200. The query processing component 200, at step S501, checks whether there remains a next spatial data in the data provider component 300 or not. If there is no spatial data therein, the process returns, i.e., goes to step S600.

At step S502, retrieved spatial data is transferred to the memory buffer management component 600 for the memory management thereof through the layer component 410. At step S503, the memory buffer management component 600 checks whether the memory buffer is sufficient or not. At step S504, the retrieved spatial data is stored in the memory buffer when the memory buffer is sufficient and then the process returns to step S501.

At step S505, when the memory buffer is not sufficient, the memory buffer management component 600 checks whether the disk buffer management component 500 is created or not. The creation of a disk buffer represents that contents of the memory buffer are stored once or more and the initialized spatial index having one grid cell is reconstructed as grid cells to the number of M by N. The disk buffer includes a plurality of disk pages, spatial data included in a same grid cell being stored in a disk page.

At step S 506, the spatial data of the memory buffer is transferred into the created disk buffer when the disk buffer management component 500 exists and then the process flows to step S504. If otherwise, at step S507, the spatial index is reconstructed, and at step S508, the disk buffer management component 500 is created and then the process goes to step S506.

Figure 6:
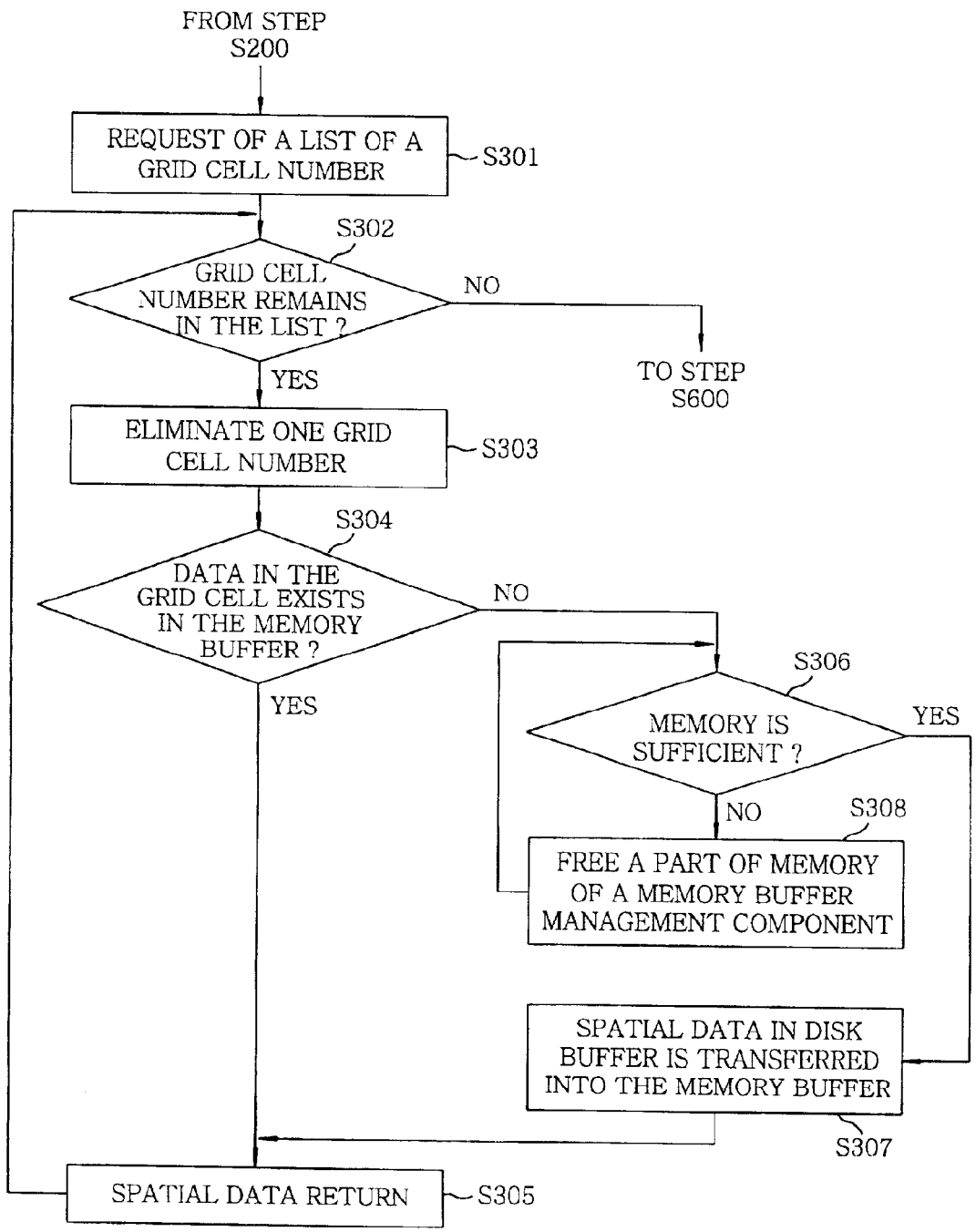
FIG. 6 gives a flow diagram of a process of data request to the layer component shown in FIG. 3.

FIG. 6 gives a flow diagram of a process (S300) of data request to the layer component shown in FIG. 3. At step S301, in order to know a memory buffer where the requested spatial data is stored, a list of a grid cell number in relation to the spatial data to be displayed is requested, thereby listing up all the grid cell numbers relating with the locations of memory buffers.

At step S302, the memory buffer management component 600 checks whether a grid cell number remains or not in the list. If a grid cell number does not remain in the list, the process goes to step S600. When the grid cell number remains, at step S303, one grid cell number is eliminated from the list. At step S304, there is checked whether spatial data included in the grid cell eliminated from the list exists or not in the memory buffer. If spatial data included in the grid cell eliminated from the list exists in the memory buffer, the process flows to step S305 and thereat, corresponding spatial data is returned to step S302.

When the spatial data included in the grid cell eliminated from the list does not exist in the memory buffer, the process goes to step S306. At step S306, there is checked whether the memory managed by the memory management component is sufficient or not. When the memory managed by the memory management component is not sufficient, at step S308, the memory buffer management component 600 requests that the total memory management component 800 frees a part of memory of a memory buffer management component and then the process returns to step S306. When the memory managed by the memory management component is sufficient, at step S307, the spatial data in the disk buffer is transferred into the memory buffer and then the process goes to step S305.

As described in the above, in accordance with the present invention, there is provided a memory management method and apparatus for use in processing multiple layer spatial data with a higher data access speed. Further, in the present invention, the spatial data/non-spatial data stored in different data servers can be easily shared by employing the open geographic information system capable of offering interoperability thereof.

While the present invention has been described with respect to certain preferred embodiments only, other modifications and variations may be made without departing from the sprit and scope of the present invention as set forth in the following claims.

What is claimed is:

1. A memory management apparatus for use in an open geographic information system comprising:

a plurality of layers, each layer requiring a layer component, a disk buffer management component, a memory buffer management component and a spatial index management component;

a layer collection component including a plurality of layer components, each layer component having responsibility of managing all of the spatial data included in one layer accessed thereto through a data provider component; and a total memory management component, wherein the total memory management component manages totally a memory buffer to a spatial data included in one or more layers, allocates a corresponding memory if each of memory buffer management components requests a memory buffer and frees a memory of a predetermined memory buffer management component when an available memory lacks.

2. A memory management method for use in a memory management apparatus in an open geographic information system, the apparatus including a display component, a query processing component, a data provider component, a layer collection component, a layer component, a disk buffer management component, a memory buffer management component, a spatial index management component and a total memory management component, the method comprising the steps of:

(a) requesting data access to a layer to be displayed next through the query processing component;

(b) inspecting whether a layer component for a corresponding layer exists or not;

(c) requesting spatial data to the layer component when the corresponding layer exists;

(d) creating a layer component and initializing a memory buffer for the memory management thereof when the corresponding layer does not exist;

(e) requesting spatial data to the data provider component and demanding memory management of spatial data through the generated layer component; and (f) displaying the requested spatial data on a screen.

3. The method of claim 2, wherein said step (d) includes the steps of:

(d1) creating a layer component for the memory management thereof;

(d2) creating a memory buffer management component;

(d3) connecting the created layer component and the created memory buffer management component to each other and registering the created memory buffer management component in the total memory management component, thereby preparing allocation of a memory buffer; and (d) creating the spatial index management component.

4. The method of claim 2, wherein said step (e) includes the steps of:

(e1) checking by the query processing component whether there exists next spatial data from the data provider component or not;

(e2) transferring retrieved spatial data to the memory buffer management component for the memory management thereof through the layer component;

(e3) checking by the memory buffer management component whether the memory buffer is sufficient or not;

(e4) storing the retrieved spatial data in the memory buffer when the memory buffer is sufficient;

(e5) checking whether the disk buffer management component is created or not when the memory buffer is not sufficient;

(e6) transferring the spatial data of the memory buffer into the created disk buffer when the disk buffer management component is created;

(e7) reconstructing the spatial index when the disk buffer management component is not created; and (e8) creating the disk buffer management component.

5. The method of claim 2, wherein said step (c) includes the steps of:
   (c1) requesting a list of a grid cell number in relation to the spatial data to be displayed, thereby listing up all the grid cell numbers relating with the locations of memory buffers;
   (c2) checking by the memory buffer management component whether a grid cell number remains or not in the list;
   (c3) eliminating one grid cell number from the list when the grid cell number remains;
   (c4) checking whether spatial data included in the grid cell eliminated from the list exists or not in the memory buffer;
   (c5) returning corresponding spatial data when spatial data included in the grid cell eliminated from the list exists in the memory buffer;
   (c6) checking whether the memory managed by the memory buffer management component is sufficient or not when the spatial data included in the grid cell eliminated from the list does not exist in the memory buffer;
   (c7) requesting that the total memory management component frees a part of memory of a memory buffer management component when the memory managed by the memory buffer management component is not sufficient; and
   (c8) transferring the spatial data in the disk buffer into the memory buffer when the memory managed by the memory buffer management component is sufficient.

6. The method of claim 3, wherein the spatial index uses a fixed grid file and is initialized as an index having one grid cell.

7. The method of claim 4, wherein the disk buffer has a plurality of disk pages.

8. The method of claim 4, wherein a storing location of the spatial data in the disk buffer is determined corresponding to a grid cell in the spatial index where the spatial data belong to.

9. The method of claim 7, wherein spatial data included in a same grid cell is stored in each of the disk pages.

* * * * *